United States Patent Office 2,955,913
Patented Oct. 11, 1960

2,955,913

SEPARATION OF RARE EARTHS BY SOLVENT EXTRACTION

Donald F. Peppard, Oak Park, and George W. Mason, Chicago, Ill., assignors to the United States of America as represented by the United States Atomic Energy Commission No Drawing. Filed Mar. 27, 1953, Ser. No. 345,258

6 Claims. (Cl. 23—23)

This invention relates to the separation of rare earths, and in particular to the separation of various rare earth salts from each other by extraction of aqueous solutions with organic solvents.

The separation of rare earths from each other to obtain them in their pure state has been one of the most difficult processes in the field of chemistry. The chemical and physical properties of the various rare earths are so similar that in general a single operation leads only to a partial separation or enrichment. In general, the best means of separating these elements has been the well-known but laborious method of fractional crystallization. Exceptions are cerium with its tetravalent state, and samarium, europium and ytterbium with their divalent states which do permit a means of separation from the normal trivalent rare earth ions.

It is an object of this invention to provide a process of separating rare earth values which are in neighboring position in the periodic table of elements.

It is another object of this invention to convert highly dilute solutions of rare earth compounds into more concentrated solutions thereof.

It has been found that, when concentrated mineral acid solutions of a plurality of rare earth salts are contacted with a substantially water-immiscible alkyl phosphate, extraction occurs for various rare earths in various degrees, the extraction increasing with increasing atomic weight and increasing atomic number. Yttrium is also extractable with the rare earths; it was found to behave as to extractability into alkyl phosphate as if it had an atomic number between 66 and 67. Thus the process of this invention also comprises the extraction of yttrium and this element is to be included hereinafter in the term rare earths.

The extraction has to be carried out from a mineral acid solution, and nitric acid and hydrochloric acid are the preferred acids. It has been found that the extraction from a nitric acid solution is greatly dependent upon the acid concentration and that the extraction as well as the selectivity are increased with increasing nitric acid concentration. It was also found, for instance in the case of yttrium and promethium, that, while at a nitric acid concentration of above about 3 N yttrium was the preferentially extractable element, at an N value of below about 3, but otherwise under the same conditions, the reverse was true and promethium was preferentially extracted. Altogether, for good results in selectively extracting rare earth values, an acid concentration of between 12 and 16 N was found best.

As in all extraction processes a so-called salting-out agent may be added. (A salting-out agent is an inorganic compound which is highly soluble in water and which, when added in sufficient amounts to an aqueous salt solution to be extracted, promotes the interchange of said salt into an organic solvent thereof.) The nitric acid or hydrochloric acid present, of course, also acts as a salting-out agent; however, often salts are added to the acid solution as salting-out agents proper. Water-soluble salts of the mineral acid present in the aqueous solution are best suitable. It has been found that, if the concentration of the salting-out salt is high, a very high extraction of all of the rare earth values is accomplished and that very little (traces only) of the cation of the salting-out salt is taken up by the solvent. However, if selectivity is desired as to rare earth extraction, a high acid concentration and a low salting-out salt content are preferred.

All alkyl phosphates that are substantially water-immiscible are suitable for the process of this invention. Trioctyl phosphate, dioctyl hydrogen phosphate and butyl phosphates are preferred. Tributyl phosphate or tributyl phosphate containing small quantities of monobutyl phosphate and dibutyl phosphate have given the best results. If pure tributyl phosphate is desired, the commercial product which usually contains small quantities of the mono- and dibutyl phosphates is washed with an aqueous, about 5%, solution of sodium carbonate whereby the mono- and dibutyl phosphates are removed into the aqueous solution.

In order to maintain the acid concentration constant during extraction, it is advisable to saturate the solvent or "preequilibrate" it by treating it with the same acid and in approximately the same concentration as it is present in the aqueous solution to be treated, in the so-called feed solution.

Tributyl phosphate, the preferred solvent for the process of this invention, has a high viscosity and a density close to that of water. These facts are responsible for a rather slow phase separation encountered in some instances. This drawback can be overcome, though, by diluting the tributyl phosphate with a low-viscosity, water-insoluble, tributyl phosphate-soluble organic substance; hydrocarbons or ethers have been found especially suitable for this purpose. For instance, dibutyl ether and mixtures of petroleum fractions have given good results. One hydrocarbon mixture sold under the trade name "Varsol" proved excellent. This Varsol consists of 60% paraffin, 30% naphthene and 10% aromatics; it has a specific gravity of 0.75, a boiling point of between 167 and 180° C. and a flash point of 49° C. Varsol reacts with concentrated nitric acid; it therefore is advantageously pretreated with concentrated nitric acid whereby the nitric acid-reactive fraction is removed and the Varsol is stabilized. A mixture of from 25 to 50% by volume of Varsol with tributyl phosphate has given good results.

In the following, a few examples of the process of this invention are presented for illustrative purposes only and without the intention to have the scope of the invention limited by, or to, the details given in these examples.

EXAMPLE I

Each of four extractors was charged with 150 ml. of tributyl phosphate which had been pre-equilibrated with 12 M hydrochloric acid. An aqueous feed 12 M in hydrochloric acid was used; this feed contained a total of 0.41 g. of rare earths in 50 ml., and the relative distribution of the various elements was: 0.5% lanthanum, 15.0% neodymium, 8.0% samarium, 3.8% europium, 14.1% gadolinium, 5.8% terbium, 25.4% dysprosium, 1.2% holmium, 3.9% erbium, 0.9% thulium, 4.3% ytterbium, trace of lutetium, and 17.1% yttrium. Fifty ml. of this feed solution were contacted with the solvent in extractor I, and the aqueous phase obtained thereby was contacted with the solvent in extractor II, the aqueous phase obtained in extractor II was contacted with the solvent in extractor III and the aqueous phase of extractor III was contacted with the solvent in extractor IV. The aqueous phase obtained in extractor IV was separated from the solvent and removed from the extractor. For the sake of simplicity, this procedure will be hereinafter referred to as "cycling"; thus the 50 ml. of feed were cycled through the four extractors. Ten 50-ml. portions of scrub solution were then successively cycled through the four extractors, scrub portions 1 to 3 being 12 M hydrochloric acid, portions 4 to 7 6 M hydrochloric acid, portions 8 and 9 was 1 M hydrochloric acid, and portion 10 was water. The feed effluent from extractor IV and each of the ten scrub effluents were analyzed for their content in neodymium, europium, dysprosium and ytterbium, as typical representatives of the various rare earths. The results are compiled in Table I.

*Table I*

| Scrub-Effluent No. | Percent (of total rare earths) back-extracted | | | |
|---|---|---|---|---|
|  | Nd | Eu | Dy | Yb |
| Feed effluent | 73 | 25 | 5 |  |
| 1 | 20 | 33 | 9 |  |
| 2 | 4 | 20 | 10 |  |
| 3 | 2.5 | 10 | 8 |  |
| 4 | 0.5 | 7 | 9 | 0.5 |
| 5 |  | 2 | 17 | 3 |
| 6 |  | 2 | 25 | 52.5 |
| 7 |  | 1 | 15 | 35 |
| 8 |  |  | 1 | 6 |
| 9 |  |  | 1 | 2 |
| 10 |  |  |  | 1 |

These analytical results illustrate that the lighter weight rare earths are eluted first and that the affinity of the various rare earths to the tributyl phosphate consistently increases with increasing atomic weight and atomic number.

In order to demonstrate more in detail the fractionation among the lanthanides by the process of this invention, scrub effluents 6–10, which contained predominantly the rare earths of the higher atomic numbers, were combined, evaporated and converted to 13 ml. of a feed solution 10 M in hydrochloric acid. This feed was cycled through four 30-ml. portions of pre-equilibrated tributyl phosphate as described above, and the four extract phases obtained were then treated by successively cycling therethrough first seven 13-ml. portions of 10 M hydrochloric acid and then six 13-ml. portions of water. The six water scrub effluents were combined and this combined solution and also the feed effluent and each of the seven hydrochloric acid scrub effluents were analyzed. The results are given in Table II.

*Table II*

| Scrub-Effluent No. | Percent (of total rare earths) back-extracted | | | | |
|---|---|---|---|---|---|
|  | Tb | Dy | Er | Yb | Lu |
| Feed effluent | 36 | 36 | 17 | 3 | 0 |
| 1 | 36 | 36 | 24 | 5 | 0 |
| 2 | 12 | 12 | 14 | 5 | 0 |
| 3 | 7 | 7 | 13 | 6 | 0 |
| 4 | 5 | 5 | 12 | 7 | 3 |
| 5 | 2.5 | 2.5 | 9 | 10 | 7 |
| 6 | 1 | 1 | 5 | 11 | 10 |
| 7 | 0.5 | 0.5 | 3 | 13 | 15 |
| Combined H₂O effluents | 0 | 0 | 3 | 40 | 65 |

Also in this instance the interdependency of amount extracted and atomic number was ascertained. The degree of enrichment obtained by this experiment can be appreciated from the following comparison: from the 50 ml. of feed that contained about 0.4 g. of rare earths, 0.9% of which were thulium, 4.3% ytterbium and less than 0.5% lutetium, 8 mg. of one product were obtained in which the respective percentages of thulium, ytterbium and lutetium were 8%, 66% and 11%.

EXAMPLE II

Seven separatory funnels were used as extractors for this experiment, which was operated in a semi-continuous, countercurrent manner. For this purpose the aqueous scrub solution was introduced into funnel No. I (the funnels were consecutively numbered), the aqueous feed solution containing the rare earths was introduced into extractor No. IV and the organic solvent into funnel No. VII. The aqueous solutions or phases from each funnel were transferred to the next following extractor, while the organic solvent or phases were transferred in each case to the preceding funnel. By this a quasi countercurrent operation was obtained, with funnels I–III functioning as the scrubbing section and funnels IV–VII as the extraction section. The aqueous solution leaving funnel No. VII and the organic solution leaving funnel No. I were the product solutions and were analyzed. Mixing of the organic and aqueous media was accomplished by manual shaking for 3 minutes. Although phase separation was usually complete after 30 seconds, a period of 3 minutes was allowed for settling.

The feed solution used in this experiment was 12 N in nitric acid, and a 12 N nitric acid was used as the scrub. The extractant was either unpurified tributyl phosphate (TBP) which contained small amounts of mono- and dibutyl phosphates and which had been pre-equilibrated with 12 N nitric acid or else the same solvent was used in dilution with 50 and 40% by volume of Varsol, respectively. The respective quantities of organic solvent, aqueous feed and aqueous scrub were 40 ml., 10 ml., and 30 ml.

Twenty-one additions or cycles were effected in each set of experiments and the aqueous and organic effluents after the twenty-first addition were analyzed as to their contents of various rare earths. The results are given in Table III, expressed in milligrams of rare earth contained in each phase.

*Table III*

| Solvent, percent by volume |  | 100% TBP | | 60% TBP + 40% Varsol | | 50% TBP + 50% Varsol | |
|---|---|---|---|---|---|---|---|
| Element | At. No. | Organic phase | Aqueous phase | Organic phase | Aqueous phase | Organic phase | Aqueous phase |
| La | 57 | <0.04 | 0.6 | <0.2 | 40 | <0.2 | 40 |
| Ce | 58 | <0.2 | 4 | <1 | 80 | <1 | 80 |
| Pr | 59 | <0.4 | 2 | <2 | 8 | <2 | 8 |
| Nd | 60 | <0.6 | 16 | <1 | 40 | <1 | 50 |
| Sm | 62 | 6 | 1 | <2 | 12 | <2 | 16 |
| Eu | 63 | 4 | 0.08 | <0.2 | <0.1 | <0.2 | <0.1 |
| Gd | 64 | 20 | <0.2 | 8 | 35 | 2 | 50 |
| Tb | 65 | 10 | <0.2 | 4 | 5 | (2)? | 10 |
| Dy | 66 | 60 | <0.2 | 100 | 25 | 70 | 100 |
| Y | 39 | 40 | 0.02 | 1,800 | 60 | 1,800 | 350 |
| Ho | 67 | 4 | <0.2 | 20 | 1 | 15 | 10 |
| Er | 68 | 6 | <0.1 | 80 | <0.2 | 80 | 15 |
| Tm | 69 | 2 | <0.2 | 15 | <0.2 | 15 | 1 |
| Yb | 70 | 6 | <0.04 | 40 | 0.1 | 40 | 1 |
| Lu | 71 | --- | --- | 5 | <0.5 | 5 | <0.5 |

These experiments again show that the extractability increases with increasing atomic number. While with the undiluted tributyl phosphate the separation between preferentially water-soluble and preferentially solvent-extractable elements occurred between neodymium and samarium, the 60% tributyl phosphate mixture caused this separation to occur between terbium and dysprosium; the 50% tributyl phosphate solvent showed separation between dysprosium and yttrium.

EXAMPLE III

Ten extractors were used and, as set forth in Example II, the scrub was introduced into the first and the tributyl phosphate into the last extractor; the feed was introduced into extractor No. VI. The operation was like that described in connection with Example II. An equilibration time of 3 minutes and a settling time of 1½ minutes were used for each contact. Undiluted pre-equilibrated tributyl phosphate was employed as the solvent. The feed was 9 N in nitric acid, the scrub 12 N in nitric acid and the acid concentration in the aqueous phase was 12±0.5 N.

Two parallel runs were carried out using identical conditions with the exception that the quantity of solvent was varied. In run No. 1 the respective volumes of feed, scrub and solvent were 50 ml., 500 ml. and 500 ml., while the corresponding quantities in the second run were 50 ml., 500 ml., and 125 ml. Forty-four additions or cycles were performed and the effluents of the forty-fourth cycle were analyzed. The results are summarized in Table IV.

*Table IV*

| Element | Run No. 1 | | Run No. 2 | |
|---|---|---|---|---|
| | Organic phase | Aqueous phase | Organic phase | Aqueous phase |
| La | <0.01 | 0.4 | <0.01 | 0.3 |
| Pr | <0.05 | 0.1 | <0.03 | 0.08 |
| Nd | <0.02 | 0.5 | <0.01 | 0.5 |
| Sm | 3.8 | 0.7 | 0.05 | 4.4 |
| Eu | 0.1 | 0.01 | 0.01 | 0.1 |
| Gd | 2.0 | <0.03 | 0.5 | 1.4 |
| Tb | 0.2 | <0.02 | 0.2 | 0.03 |
| Dy | 0.8 | <0.02 | 0.9 | 0.03 |
| Y | 1.7 | <0.02 | 1.8 | <0.01 |
| Ho | 0.05 | <0.02 | 0.05 | <0.02 |
| Er | 0.2 | <0.01 | 0.2 | <0.01 |
| Tm | 0.01 | <0.01 | 0.01 | <0.01 |
| Yb | 0.04 | <0.01 | 0.05 | <0.01 |

The two runs show that the quantity of solvent used has a bearing on the location of the split between preferentially aqueous-soluble and preferentially solvent-soluble rare earths. While the line of separation in run 1 was between neodymium and samarium, it was located between gadolinium and terbium in run 2.

Examples II and III demonstrate that the cut between water-soluble and solvent-soluble rare earths can be adjusted at will by varying the quantity of diluent or the volume ratio of solvent:feed+scrub. Another factor which has been found to have an effect on the location of the split is the acid concentration in the aqueous phase.

In order to separate and isolate one certain element of the rare earth group, extraction is first carried out, for instance, so that separation takes place adjacent said certain element; the fraction containing said certain element is then contacted again with alkyl phosphate under varied conditions so that the separation takes place on the other side of said certain element. Of course, in some instances a number of fractionations will be necessary in order completely to isolate one element.

In cases where the rare earths are not only to be separated from each other but also from contaminants such as, for instance, aluminum, calcium, magnesium and sodium, it is advisable first to coextract the rare earth values with alkyl phosphate for the purpose of decontamination; aluminum, calcium, magnesium and sodium remain in the aqueous solution. Thereafter the separation of the rare earths can be accomplished by selectively back-extracting with nitric acid and using alkyl phosphate as the scrub medium. For the first step, the coextraction of the rare earth values and their separation from the above-enumerated contaminants, a high concentration of salting-out agent and a low concentration of free acid in the aqueous solutions are advisable, while the selective back-extraction is preferably carried out with a salting-out-agent-free concentrated acid solution. The efficiency of the decontamination step is illustrated in Example IV.

EXAMPLE IV

An aqueous mixture containing 1 g. each of lanthanum, gadolinium, yttrium, scandium, aluminum, magnesium and calcium in the form of their nitrates was converted to 100 ml. of a solution saturated with respect to ammonium nitrate and being about 0.2 N in nitric acid. This solution was cycled through four 100-ml. portions of pre-equilibrated tributyl phosphate; thereafter six 25-ml. portions of an aqueous scrub 10 N in ammonium nitrate and 0.2 N in nitric acid were cycled through the four tributyl phosphate solutions. The scrub effluents were combined and the resulting solution was analyzed for their rare earths contents; the solvent phases of the four extractors were also combined and analyzed for their contents in aluminum, magnesium and calcium. The results are shown in Table V.

*Table V*

| Phase | Percent of initial quantity | | | | | | |
|---|---|---|---|---|---|---|---|
| | La | Gd | Y | Sc | Al | Mg | Ca |
| Combined scrubs | 1 | <0.1 | <0.1 | <0.02 | ~100 | ~100 | ~100 |
| Combined solvents | 99 | 99.9 | 99.9 | 99.9 | <0.1 | <0.01 | <0.1 |

These results prove that a high concentration of salting-out agent and low acidity accomplish a practically complete coextraction of the rare earths and a quantitative separation thereof from the contaminants.

Rare earth solutions frequently have a higher content of relatively lighter elements and smaller quantities of the heavier elements. For instance, a typical commercial yttrium oxide contains from 0.3 to 0.9% each of lutetium oxide, thulium oxide and ytterbium oxide, about 75% of yttrium oxide and 10% of gadolinium oxide. By the process of this invention such a solution can be enriched as to lutetium, ytterbium and thulium, which are extracted most easily, and the elements can then be individually recovered from the solvent phase obtained by again applying the process of this invention and selectively back-extracting the lighter weight elements of the group. The process of this invention may also be used as a pretreatment for converting the solutions into one of sufficient concentration for subsequent fractionation by adsorption on ion exchange resins.

The various salts of the various rare earths have different colors and are suitable as pigments.

It will be understood that this invention is not to be limited to the details given herein but that it may be modified within the scope of the appended claims.

What is claimed is:

1. A process of separating elements selected from the group consisting of lanthanum, cerium (III), praseodymium, neodymium, promethium, samarium, europium, gadolinium, terbium, dysprosium, holmium, erbium, thulium, ytterbium, lutetium, and yttrium from each other, consisting of providing an aqueous medium having free mineral acid in a concentration of at least 3 N and a substantially water-immiscible organic alkyl phosphate-containing medium, one of said media containing said elements; contacting said media whereby those of said elements which have the highest atomic number are preferentially held by said alkyl phosphate and the extractability of the various elements by said alkyl phosphate decreases in the order of the atomic number; contacting said alkyl phosphate with a plurality of aqueous mineral acid solutions whereby fractions of aqueous rare earth solutions are formed; and collecting each fraction separately.

2. The process of claim 1 wherein the mineral acid is hydrochloric acid.

3. The process of claim 1 wherein the mineral acid is nitric acid.

4. The process of claim 3 wherein the nitric acid concentration ranges from 12 to 16 N.

5. The process of claim 1 wherein the alkyl phosphate contains mono-, di- and tributyl phosphates.

6. The process of claim 1 wherein the alkyl phosphate is tributyl phosphate.

References Cited in the file of this patent

UNITED STATES PATENTS

| | | |
|---|---|---|
| 2,564,241 | Warf | Aug. 14, 1951 |
| 2,683,655 | Peppard et al. | July 13, 1954 |

OTHER REFERENCES

J. C. Warf: AECD–2524, Aug. 7, 1947, Decl. Mar. 11, 1949.

Peppard, Fares, Gray and Mason: AECD–3327; ANL–WMM–927, January 17, 1952, declassified Mar. 21, 1952.

A. C. Topp: ORNL–1409, Sept. 26, 1952.